(No Model.) 2 Sheets—Sheet 2.
D. S. WILLIAMS.
ELECTRIC BATTERY.
No. 552,218. Patented Dec. 31, 1895.
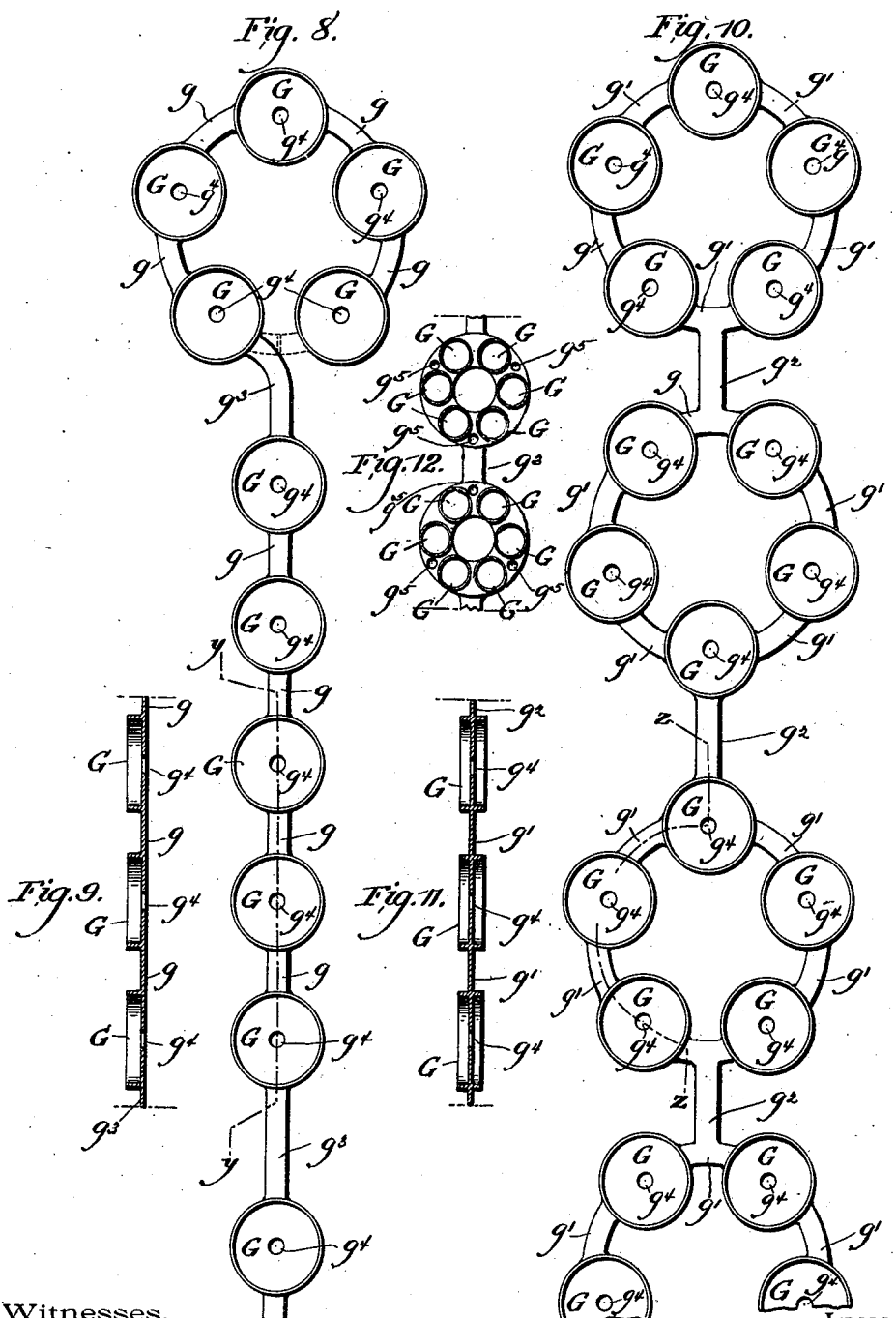
Witnesses.
Robert W. Lloyd
Thos. A. Robertson
Inventor.
David S. Williams

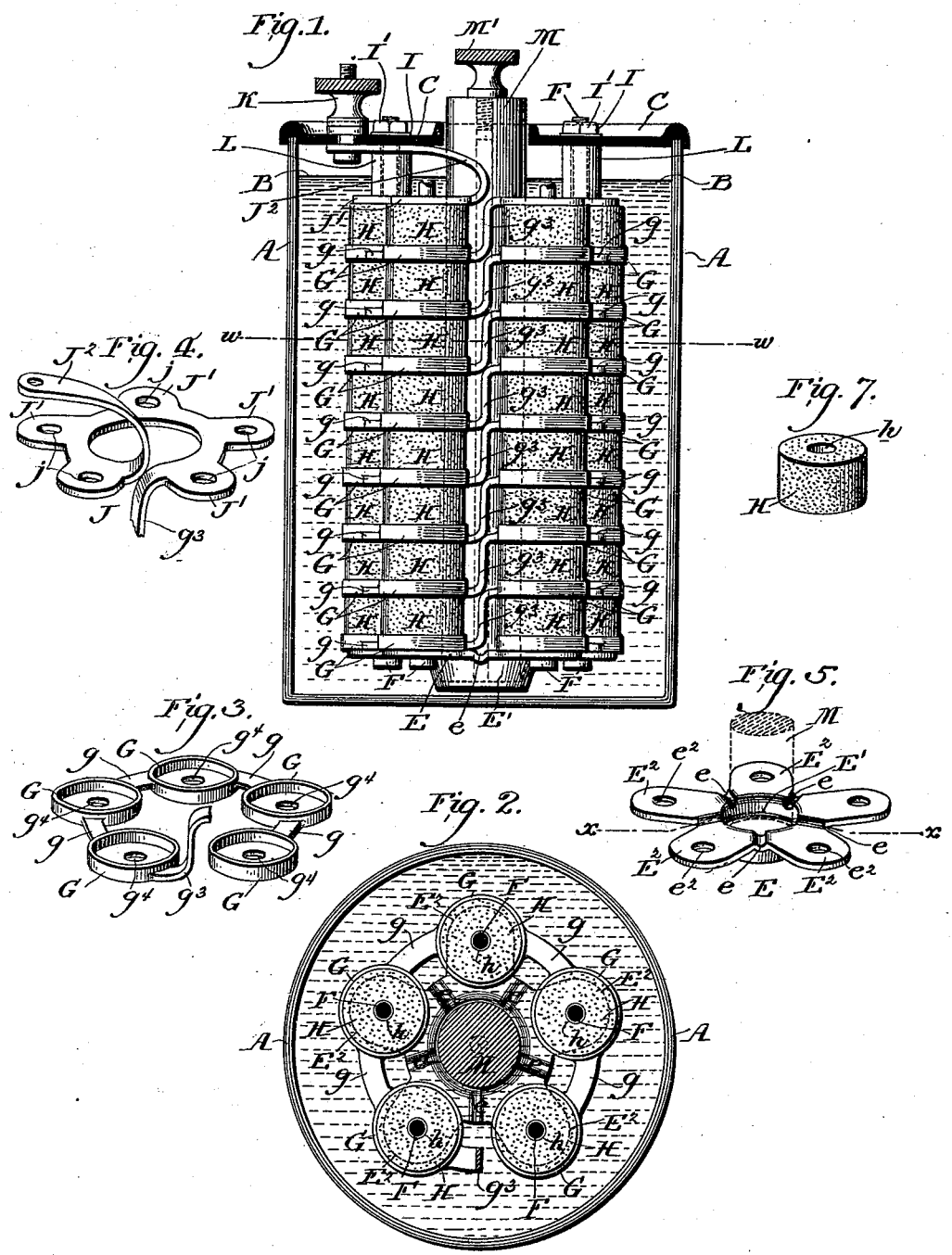

UNITED STATES PATENT OFFICE.

DAVID S. WILLIAMS, OF PHILADELPHIA, PENNSYLVANIA.

ELECTRIC BATTERY.

SPECIFICATION forming part of Letters Patent No. 552,218, dated December 31, 1895.

Application filed July 19, 1895. Serial No. 556,446. (No model.)

*To all whom it may concern:*

Be it known that I, DAVID S. WILLIAMS, a citizen of the United States, residing at Philadelphia, in the county of Philadelphia and State of Pennsylvania, have invented certain new and useful Improvements in Electric Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in batteries; and it consists essentially in a novel construction and arrangement of the various parts comprising the cathode or negative electrode of said batteries.

The type of accumulator to which my invention is particularly adapted is one in which an oxide of lead is employed as an active agent in the cathode or negative element and in which the lead oxide is formed in disks or blocks of suitable size and then treated electrochemically to form a peroxide of lead prior to being assembled in the form best adapted as the negative element in an accumulator or storage-battery.

In practice I find where a large mass of peroxide is used—that is a disk or block of great breadth and thickness—the energy upon the surface or only to a slight depth below the surface is available, the remaining portion being treated at a great loss, and, furthermore, that the conductors employed in forming said element and in supporting said peroxide should be continuous and free from joints of any kind formed by soldering or otherwise.

My object, therefore, is to form the peroxide in small sections, as shown in the drawings and more fully described hereinafter, and to arrange them in piles around the positive element, allowing between each pile suitable space for the free circulation of the electrolyte contained within the vessel, and, furthermore, to construct and arrange the conductors in such a manner that there will be a continuous and unbroken line of metallic conducting-surface from the bottom to the top of the electrode. I further provide means by which the positive element is supported by, although insulated from, the cathode or negative electrode.

Referring now to the accompanying drawings, Figure 1 represents a side elevation of an accumulator constructed in accordance with my invention, the jar or containing-vessel and the cover being shown in section. Fig. 2 is a horizontal section on the line $w\,w$ of Fig. 1. Fig. 3 is a detached perspective view of a portion of the conductors. Fig. 4 is a perspective view of the terminus or upper portion of the conductors. Fig. 5 is a perspective view of a hard-rubber plate forming the lower portion of the cathode or negative electrode, showing a well for the reception of the anode or positive element. Fig. 6 is a section on the line $x\,x$ of Fig. 5. Fig. 7 is a perspective view of one of the sections of peroxide of lead forming the negative element. Fig. 8 is a plan view of the metallic conductors after being pressed into shape and prior to being formed into an electrode, the upper portion of said figure showing the method of winding said metallic conductors into the form of an electrode. Fig. 9 is a section on the line $y\,y$ of Fig. 8. Fig. 10 is a plan view showing a modified form of metallic conductors. Fig. 11 is a section on the line $z\,z$ of Fig. 10, presuming the portion of the conductor therein shown to be straightened out. Fig. 12 is a plan view showing a still further modified form of conductors in which case the supporting-rods pass through the conducting-plates only and not through the sections of peroxide, as shown in Figs. 1 and 2.

Similar letters of reference refer to similar parts throughout all the views of the drawings.

A is a jar or containing-vessel.

B is the electrolyte.

C is the cover formed of hard rubber or other non-conducting material to which the negative electrode is firmly secured.

The negative electrode consists of a base-plate E, formed of hard rubber or other non-conducting material, and having a central depression or well E' for centering and supporting the positive element, and where the latter consists of a bar of zinc the well E' may also serve to retain a small quantity of mercury for the purpose of amalgamating said zinc, in which case the grooves $e\,e$ will prevent the mercury from coming in contact with the negative electrode and producing a short circuit, should the jar be tilted in handling, by allowing the mercury to escape through the grooves $e\ e$ into the bottom of the jar.

$E^2\ E^2$ are projections having openings $e^2\ e^2$ for the reception of supporting-rods F, said rods being preferably formed of hard rubber or other like material which is capable of withstanding the corrosive influence of the electrolyte and sections of peroxide. These rods, together with the plate E and cover C, form the permanent structure of the anode or positive electrode.

The conductors G are made from strips of rolled lead pressed into the cup form shown in Figs. 8 and 9—that is, a series of cups $G'$ are united together by thin strips $g$ and are afterward wound around spirally, as shown at the top of Fig. 8, but more fully illustrated in the completed cell shown in Figs. 1 and 2. If desired, however, a form like that illustrated in Figs. 10 and 11 may be employed, in which the cups $G'$ are depressed from both sides (see Fig. 11) and are united together by thin conducting-strips $g'$ to form a ring of cups, several rings being united together to form a complete electrode by means of strips $g^2$, which will produce, in conjunction with the active material, an electrode, the conductors of which are continuous and unbroken.

In the preferred form shown in Figs. 8 and 9 the section of the conductor $g^3$ is made of sufficient length to pass from the last cup forming the circle of the lower pile to the next cup forming the pile above, as shown in Fig. 1, sufficient fullness being allowed for the slight expansion of the sections H of lead peroxide between the conductors.

The sections H of peroxide and the cups G forming part of the conductors have holes $h$ and $g^4$, through which the supporting-rods F pass; but, if desired, said supporting-rods may pass through openings $g^5$ on the outside of the conductors, as shown in Fig. 12, in which case neither the cup portion of the conductors nor the sections of peroxide will contain the central openings $g^4$ and $h$ shown and described.

The conductors G terminate in a flat plate J, having projections $J'$, which rest upon the top of the upper sections of lead peroxide, said plate J having holes $j$ to receive the supporting-rods F. A connection $J^2$ leads from the plate J to a binding-post K, mounted upon the cover C, to which a wire leading from the negative element may be secured. Spacing-collars L surround the supporting-rods F between the cover C and plate J.

The positive element M may consist of finely-divided or spongy lead formed upon a central support, or may be formed of a bar of zinc, as shown in Figs. 1 and 2, thoroughly amalgamated and having a binding-post $M'$, secured to the top thereof.

Having now fully described my invention, what I claim, and desire to secure by Letters Patent, is—

1. A supporting device for a sectional cathode, said supporting device comprising a number of superposed receptacles connected together horizontally and forming a continuous yielding conductor, said receptacles being in electrical contact above and below with all the sections of the cathode.

2. In combination, a cathode comprising a series of separate blocks of a high metallic oxide and a continuous conducting and supporting structure comprising a line of superposed cup shaped receptacles connected together horizontally and forming a continuous yielding conductor, said receptacles being in electrical contact at the top and bottom with all of said blocks.

3. A cathode comprising a number of sections of a high oxide of lead or other suitable metal arranged in a circular series of superposed blocks, and a continuous strip of conducting material comprising a number of cup shaped receptacles for supporting and holding said blocks and extending in a substantially helical line from the base to the top of said cathode and in contact with all of the sections of the cathode.

4. A cathode comprising a number of detachable sections or blocks of a high metallic oxide arranged in a substantially helical line and being equidistant from a centrally disposed anode; conductors comprising a series of receiving cups in electrical contact at the top and bottom of said blocks and having intervening conducting strips integral with said cups, with rods for securing the blocks and cups in position.

5. The combination in an electric battery of the jar or casing, a cathode formed of a series of separate blocks of a high oxide, connected by a conducting strip, a bottom cup or plate of non-conducting material secured to the base of said cathode, and an anode resting in and supported by said cup or plate, substantially as specified.

6. The combination in an electric battery of the jar or casing, a cathode formed of a series of separate blocks of a high oxide, a conducting strip connected to and supporting each separate block, a centrally disposed anode, and a cup or plate formed of non-conducting material secured to the base of the cathode and supporting said anode, substantially as specified.

7. The combination in an electric battery of a cell or jar, a series of cups, G, united in a continuous series by intervening connecting strips, $g$, formed integral with said cups, the whole being arranged in substantially helical form, a series of separate blocks, H, of a high oxide, adapted to fit one within each of the cups, G, a bottom cup shape plate, E, formed of non-conducting material secured to the base of the cathode, a series of channels or slots, $e$, being formed in said cup shaped plate, and an anode adapted to be supported by said cup shaped plate, substantially as specified.

8. A series of independent walled receptacles for the active material of an electric battery, said independent receptacles being connected by a yielding conductive material.

9. A cathode comprising a series of superposed cup-shaped receptacles between pairs of which is supported the active material and yielding conductive material connecting the cup-shaped receptacles.

10. An integral conducting and supporting device for a cathode comprising alternately walled supporting devices for the active material and conductive strips.

11. An integral conducting and supporting device for a cathode comprising alternately supporting devices for the active material and yielding conductive strips.

12. An integral conducting and supporting device for a cathode, comprising alternately supporting devices for the active material and conductive strips, the whole being folded upon itself.

13. A conductive and supporting strip, formed of a series of walled receptacles for the active material, connected by yielding conductive material.

14. A conductive and supporting strip, formed of a series of receptacles for the active material connected by conductive material, the strip being folded upon itself.

15. A conductive and supporting strip, formed of a series of receptacles for the active material, connected by yielding conductive material, the strip being folded upon itself.

16. A cathode comprising a series of superposed double cup-shaped receptacles, the active material being retained between the upper cup of one and the lower cup of the other of pairs of superposed cups, the cups being connected by yielding conductive material.

In testimony whereof I affix my signature in presence of two witnesses.

DAVID S. WILLIAMS.

Witnesses:
GEORGE F. DRURY,
ROBERT W. LLOYD.